United States Patent Office 2,775,154
Patented Dec. 25, 1956

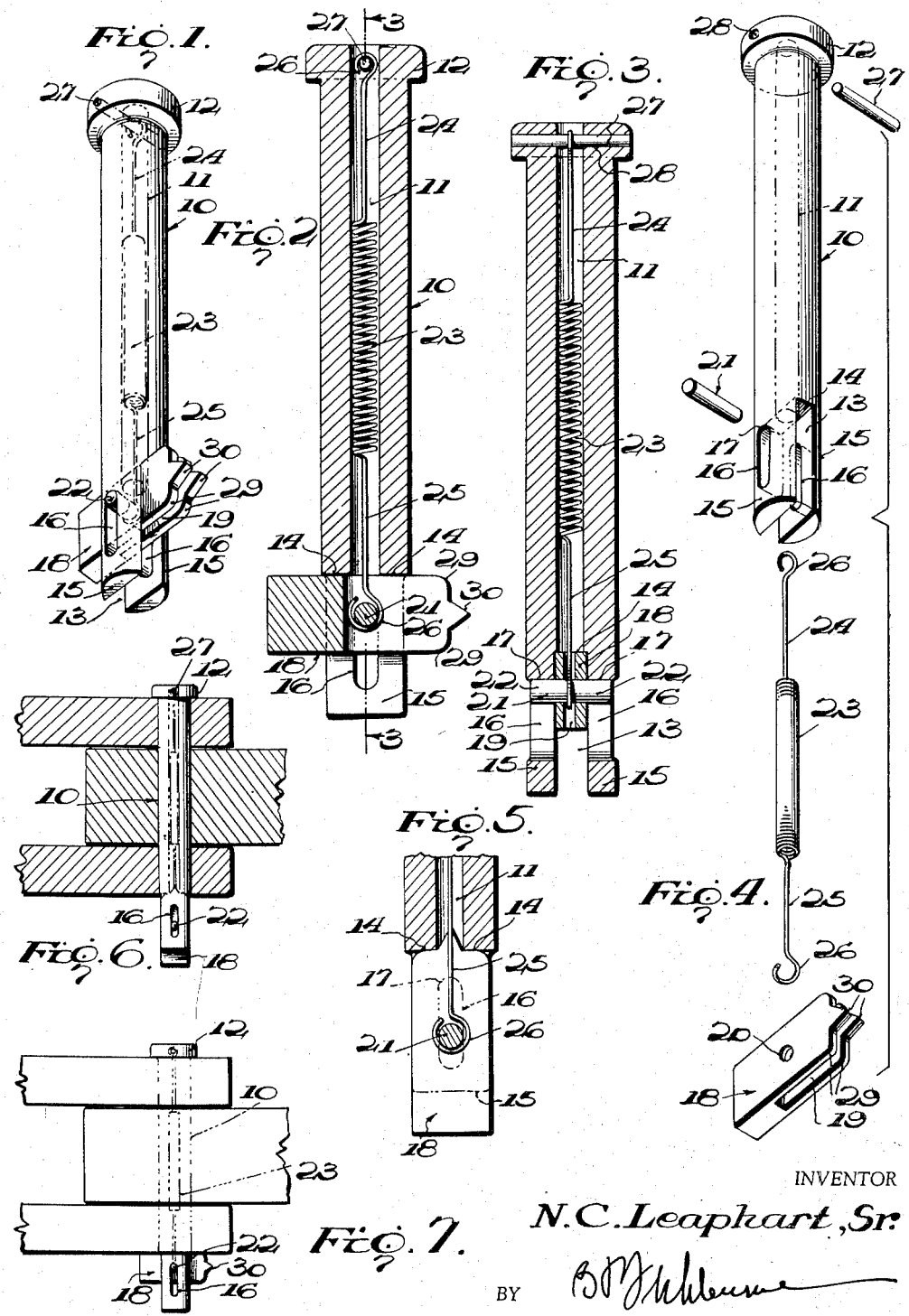

2,775,154

COUPLING PIN FOR SEPARABLE PARTS HAVING SPRING URGED PIVOTAL LOCKING PLATE THEREON

Noah C. Leaphart, Sr., Leesville, S. C.

Application November 20, 1953, Serial No. 393,261

1 Claim. (Cl. 85—3)

My invention relates to a coupling pin for use in coupling together various separable members, and is particularaly adapted to be used for connecting various agricultural attachments to the draw bars of tractors, and for connecting trailers to automobiles, trucks and the like.

A primary object of the invention is to provide a coupling or hitch pin having a self-contained locking element or key permanently connected therewith, in a manner rendering the coupling pin easy and convenient to use, reliable and efficient in operation, and affording a very sturdy connection between the members which are coupled by the pin.

A further object is to provide a coupling pin which eliminates entirely the need for screw threaded parts, such as nuts and the like, the pin being highly compact and simplified in construction, and inexpensive to manufacture.

A still further object is to provide a coupling pin of the above-mentioned character having an adjustable coupling element or key, adapted to be held by a spring in two positively locked or adjusted positions, the spring being disposed bodily within a bore of the coupling pin and protected by the bore from the elements and the like.

Other objects and advantages of the invention will be apparent during the course of the following description.

In the accompanying drawings, forming a part of this application, and in which like numerals are employed to designate like parts throughout the same, Figure 1 is a perspective view of a coupling pin embodying my invention, Figure 2 is an enlarged central vertical longitudinal section through the same, Figure 3 is a similar section taken on line 3—3 of Figure 2, Figure 4 is an exploded perspective view of the coupling pin, Figure 5 is a fragmentary vertical section through one end of the coupling pin showing the adjustable locking element adjusted to extend longitudinally of the body portion of the pin, Figure 6 is a side elevation of the coupling pin on a reduced scale, and illustrating how the pin is introduced into the openings of separable members to be coupled by the pin, and Figure 7 is a side elevation of the pin and coupled members after the locking element of the pin has been shifted to the transverse or locking position.

In the drawings, where for the purpose of illustration is shown a preferred embodiment of my invention, the numeral 10 designates generally an elongated cylindrical body portion or pin having a central longitudinal bore 11 extending therethrough, and opening through the headed end of the pin, the pin being provided at one end with a somewhat enlarged cylindrical head 12, as shown. The opposite end of the pin 10 is provided centrally with a slot 13, opening through the opposite sides of the pin and extending longitudinally of the pin for a substantial distance, and forming transverse shoulders 14 at the inner end of the slot 13, upon opposite sides of the bore 11. The bore 11 opens into the slot 13, as shown. The slot 13 forms bifurcated or forked extensions 15 at the forward end of the pin 10, and these extensions are provided somewhat rearwardly or inwardly of their forward ends with laterally aligned parallel longitudinal elongated slots 16, the inner ends 17 of which terminate somewhat forwardly of the shoulders 14, as shown. The slots 16 open into the central longitudinal slot 13.

A generally rectangular flat and somewhat elongated locking element or plate 18 is provided, and disposed slidably within the slot 13 and between the extensions 15, the thickness of the locking plate 18 preferably being such that the locking plate has a smooth sliding fit between the extensions 15. The width of the locking plate 18 is preferably substantially equal to the diameter of the pin 10, or slightly smaller, as shown. The length of the locking plate 18 is preferably somewhat greater than the lengths of the extensions 15 formed by the slot 13.

The locking plate 18 is provided in one end with a relatively narrow slot 19, opening through the opposite side edges of the locking plate, and preferably extending for about one-half the length of the locking plate, as shown. The locking plate 18 is further provided at substantially its longitudinal center and at its transverse center with a transverse opening 20, extending through the opposite sides of the locking plate and intersecting the slot 19. A transverse pin 21 has a press fit within the opening 20, and extends equidistantly beyond the opposite sides of the locking plate 18 to form trunnions 22, slidably received by the slots 16, and freely movable longitudinally therein. The opposite ends of the pin 21 are preferably substantially flush with the outer sides of extensions 15, as shown.

A retractile coil spring 23 is mounted within the bore 11, and located centrally therein, and this spring includes end axial extensions or arms 24 and 25, integral therewith. The ends of the arms 24 and 25 are bent to form eyes 26, as shown. One eye 26 receives a transverse anchoring pin 27, held within a transverse opening 28 formed in the head 12, and intersecting the bore 11. The ends of the pin 27 are preferably flush with the periphery of the head 12, and the pin 27 and the associated eye 26 are disposed inwardly of the end of the pin 10 having the head 12. The arm 25 extends into the slot 19, and the other eye 26 receives the pin 21 within the slot 19, as shown. The spring 23 is thus connected with the locking plate 18 at all times, and forms a resilient connection between the locking plate and pin 10, and constantly urges the locking plate 18 toward the shoulders 14 in all adjusted positions of the locking plate.

The inner end of the locking plate 18 has rounded shoulders or corners 29, to provide a smooth cam action between the inner end of the locking plate and the shoulders 14. Tapered, preferably V-shaped detents or lugs 30 are integrally formed upon the inner end of the locking plate 18, at opposite sides of the slot 19. The detents 30 are adapted to enter the bore 11, as shown, between the shoulders 14, for positively securing the locking plate 18 in position longitudinally of the pin 10, as shown in Figure 5. When the locking plate 18 extends transversely of the pin 10, Figure 2, its opposite ends are spaced substantial distances beyond opposite sides of the pin 10, and one longitudinal edge of the locking plate 18 then engages the shoulders 14, and the trunnions 22 contact or substantially contact the ends 17 of slots 16. When the locking plate 18 extends longitudinally of the pin 10, Figure 5, its forward end projects somewhat forwardly of the extensions 15, and the trunnions 22 are located near the forward ends of the slots 16.

In use, the locking plate 18 is arranged longitudinally of the pin 10, and the detents 30 are engaged within the forward end of bore 11. The locking plate is now positively held in the longitudinally adjusted position by the spring 23 and detents 30, and will not move from such position, until the detents 30 are disengaged from the bore 11. The pin 10 is now introduced axially through the aligned openings of the members which it is desired to couple, as shown in Figure 6, and the pin 10 extends entirely through the coupled members, with the extensions 15 and locking plate 18 extending beyond the outer side of one outermost coupled member. When the head 12 is in engagement with the other outermost coupled member, Figures 6 and 7, the forward end of the locking plate 18 is grasped, and the locking plate is drawn longitudinally forward, until the trunnions 22 engage the forward ends of slots 16. When this is done, the detents 30 are out of engagement with the bore 11, and the locking plate is now pivoted to the transverse position and released, for engagement with the shoulders 14 and/or the outer side of the adjacent outermost coupled member, Figure 7. The spring 23 now maintains the locking plate 18 in positive engagement with the shoulders 14, and the three members shown in Figures 6 and 7 are effectively coupled together, with no possibility of the coupling pin 10 becoming accidentally disengaged therefrom.

When it is desired to uncouple the members, it is merely necessary to exert pressure on one end of the locking plate 18, and pivot the same to the longitudinal position shown in Figures 5 and 6. When this is done, the rounded corners 29 will ride smoothly over the shoulders 14, with a cam action, and the detents 30 wil again engage the bore 11, for releasably locking the plate 18 in the longtiudinally adjusted position. The coupling pin 10 is then readily removable from the aligned openings of the coupled members.

My coupling pin is obviously capable of a wide variety of uses, where it is desired to releasably couple together separable members or bars. I believe that the device will prove particularly useful for the coupling of certain agricultural implements to the draw bars of tractors, and for coupling the tongues of trailing vehicles to towing vehicles, such as automobiles, trucks, and the like.

It is to be understood that the form of the invention, herewith shown and described is to be taken as a preferred example of the same and that various changes in the shape, size and arrangement of parts may be resorted to, without departing from the spirit of the invention or scope of the subjoined claim.

Having thus described my invention, I claim:

A coupling device comprising a main tubular pin having a longitudinal bore, said pin being provided at one end with a main longitudinal slot which extends through such end, said slot having said bore leading into the same, said main longitudinal slot forming spaced longitudinal extensions, said extension having longitudinal slots which lead into the main longitudinal slot, an adjustable locking plate disposed within the main longitudinal slot and arranged between said extensions, said adjustable locking plate having a longitudinal slot terminating short of one end of the locking plate and extending through the opposite end of said locking plate and also extending through the side edges of the locking plate, said locking plate being provided at the open end of the slot of the locking plate with tapered detents disposed near the central longitudinal axis of the locking plate, a pivot pin secured to the locking plate near its center and extending transversely of the locking plate and passing through the slot of the locking plate and projecting beyond the sides of the locking plate and held within the longitudinal slots of said extensions, and a retractile coil spring bodily mounted within the bore of the tubular pin and including a first longitudinal arm attached to the end of the main tubular pin remote from the locking plate and a second longitudinal arm extending into the slot of the locking plate and attached to the pivot pin of the locking plate, the arrangement being such that when the locking plate is in the transverse position it is held in contact with the walls of the main slot by the retractile coil spring, the spring permitting the pivot pin to shift outwardly longitudinally within the longitudinal slots of said extensions so that the closed end of the locking plate is arranged next to the outer ends of said extensions and the detents will then be held within the adjacent end of said bore, the arm of said spring which is secured to said pivot pin then being arranged within the open end of the slot of the locking plate adjacent to said detents, the locking plate being then swingable in either direction to return the locking plate to the transverse position, the retractile spring tending to hold the locking plate in the longitudinal position with the detents within said bore.

References Cited in the file of this patent
UNITED STATES PATENTS

| | | |
|---|---|---|
| 939,921 | Moeller | Nov. 9, 1909 |
| 1,371,396 | Reveny | Mar. 15, 1921 |
| 1,974,966 | McClure | Sept. 25, 1934 |
| 2,287,117 | Montalto | June 23, 1942 |
| 2,660,083 | Tyson | Nov. 24, 1953 |

FOREIGN PATENTS

| | | |
|---|---|---|
| 458,491 | Germany | Sept. 19, 1925 |